(12) United States Patent
Dewasurendra et al.

(10) Patent No.: US 10,855,901 B2
(45) Date of Patent: Dec. 1, 2020

(54) DEVICE ADJUSTMENT BASED ON LASER MICROPHONE FEEDBACK

(71) Applicant: QUALCOMM Incorporated, San Diego, CA (US)

(72) Inventors: Duminda Dewasurendra, San Diego, CA (US); Vivek Rajendran, San Diego, CA (US); Daniel Jared Sinder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/913,716

(22) Filed: Mar. 6, 2018

(65) Prior Publication Data

US 2019/0281205 A1 Sep. 12, 2019

(51) Int. Cl.
| | |
|---|---|
| H04N 5/232 | (2006.01) |
| G10L 25/78 | (2013.01) |
| H04R 23/00 | (2006.01) |
| H04R 1/32 | (2006.01) |

(52) U.S. Cl.
CPC ......... *H04N 5/23203* (2013.01); *G10L 25/78* (2013.01); *H04N 5/23296* (2013.01); *H04R 1/326* (2013.01); *H04R 23/008* (2013.01)

(58) Field of Classification Search
CPC ........ H04R 1/32; H04R 1/326; H04R 23/008; H04R 29/00; H04R 29/004; H04R 29/005; H04R 2201/40; H04R 3/005; H04R 1/406; H04N 5/23203; H04N 5/232296; H04N 5/23299; G10L 25/78
See application file for complete search history.

(56) References Cited

U.S. PATENT DOCUMENTS

| | | | | |
|---|---|---|---|---|
| 10,362,409 | B1* | 7/2019 | Dewasurendra | ........ G01S 17/58 |
| 2006/0227237 | A1* | 10/2006 | Kienzle | ................ G08B 13/194 |
| | | | | 348/343 |
| 2007/0237358 | A1* | 10/2007 | Tseng | ................ G08B 13/19608 |
| | | | | 382/103 |
| 2014/0028861 | A1* | 1/2014 | Holz | .................. H04N 5/23277 |
| | | | | 348/208.4 |
| 2015/0312662 | A1* | 10/2015 | Kishimoto | ............. H04R 3/005 |
| | | | | 381/92 |
| 2016/0100092 | A1* | 4/2016 | Bohac | .................... H04N 7/188 |
| | | | | 382/103 |
| 2017/0019744 | A1* | 1/2017 | Matsumoto | .......... H04R 29/008 |
| 2017/0026763 | A1* | 1/2017 | Pratt | ..................... G06F 16/683 |
| 2017/0150254 | A1* | 5/2017 | Bakish | .................... G10L 25/93 |
| 2019/0041258 | A1* | 2/2019 | Bahadirlar | ............. G01H 9/004 |

* cited by examiner

*Primary Examiner* — Jason R Kurr
(74) *Attorney, Agent, or Firm* — Moore IP

(57) ABSTRACT

A method of capturing video includes instructing a microphone to initiate an audio scan of different areas of interest to detect audio activity. The method also includes receiving a feedback signal from the microphone in response to initiating the audio scan. The feedback signal indicates audio activity in a particular area of interest. The method further includes adjusting targeting characteristics of a device based on the feedback signal to focus the device on the particular area of interest.

23 Claims, 8 Drawing Sheets

DEVICE ADJUSTMENT BASED ON LASER MICROPHONE FEEDBACK

I. FIELD

The present disclosure is generally related to a monitoring device.

II. DESCRIPTION OF RELATED ART

Advances in technology have resulted in more powerful computing devices. For example, computing devices such as laptop and desktop computers and servers, as well as wireless computing devices such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A video camera, such as a surveillance camera, may be mounted on a wall or fixture to capture activity of surrounding areas. However, because a conventional video camera has a limited field of view, the conventional video camera is not able to capture video that covers all of the surrounding areas. For example, video captured by the conventional video camera may be limited to areas within the field of view. As a result, multiple video cameras are used to capture activity of surrounding areas. Using multiple video cameras to capture activity of surrounding areas may be expensive and may involve inefficient use of resources. For example, if activity is occurring in a particular area captured by a single video camera of the multiple video cameras, the other video cameras may be capturing motionless video.

III. SUMMARY

According to a particular implementation of the techniques disclosed herein, an apparatus includes a microphone, a device, and a processor coupled to the microphone and to the device. The processor is configured to instruct a microphone to initiate an audio scan of different areas of interest to detect audio activity. The processor is also configured to receive a feedback signal from the microphone in response to initiating the audio scan. The feedback signal indicates audio activity in a particular area of interest. The processor is further configured to adjust targeting characteristics of the device based on the feedback signal to focus the device on the particular area of interest.

According to another particular implementation of the techniques disclosed herein, a method of capturing video includes instructing a microphone to initiate an audio scan of different areas of interest to detect audio activity. The method also includes receiving a feedback signal from the microphone in response to initiating the audio scan. The feedback signal indicates audio activity in a particular area of interest. The method further includes adjusting targeting characteristics of a device based on the feedback signal to focus the device on the particular area of interest.

According to another particular implementation of the techniques disclosed herein, a non-transitory computer-readable medium includes instructions that, when executed by a processor, cause the processor to perform operations including instructing a microphone to initiate an audio scan of different areas of interest to detect audio activity. The operations also include receiving a feedback signal from the microphone in response to initiating the audio scan. The feedback signal indicates audio activity in a particular area of interest. The operations further include adjusting targeting characteristics of a device based on the feedback signal to focus the device on the particular area of interest.

According to another particular implementation of the techniques disclosed herein, an apparatus includes means for scanning different areas of interest to detect audio activity. The apparatus also includes means for capturing video. The apparatus further includes means for adjusting targeting characteristics of the means for capturing video based on a feedback signal to focus the means for capturing video on a particular area of interest. The feedback signal is received from the means for scanning, and the feedback signal indicates audio activity in the particular area of interest.

One advantage of the above-described implementations is that a single device can capture video of activity using audio triggers captured by the microphone. For example, the microphone scans different areas for audio activity, and based on a location associated with the audio activity, the device is adjusted (e.g., tilted, rotated, refocused, etc.) to capture video of the location. Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

Figure 1A:
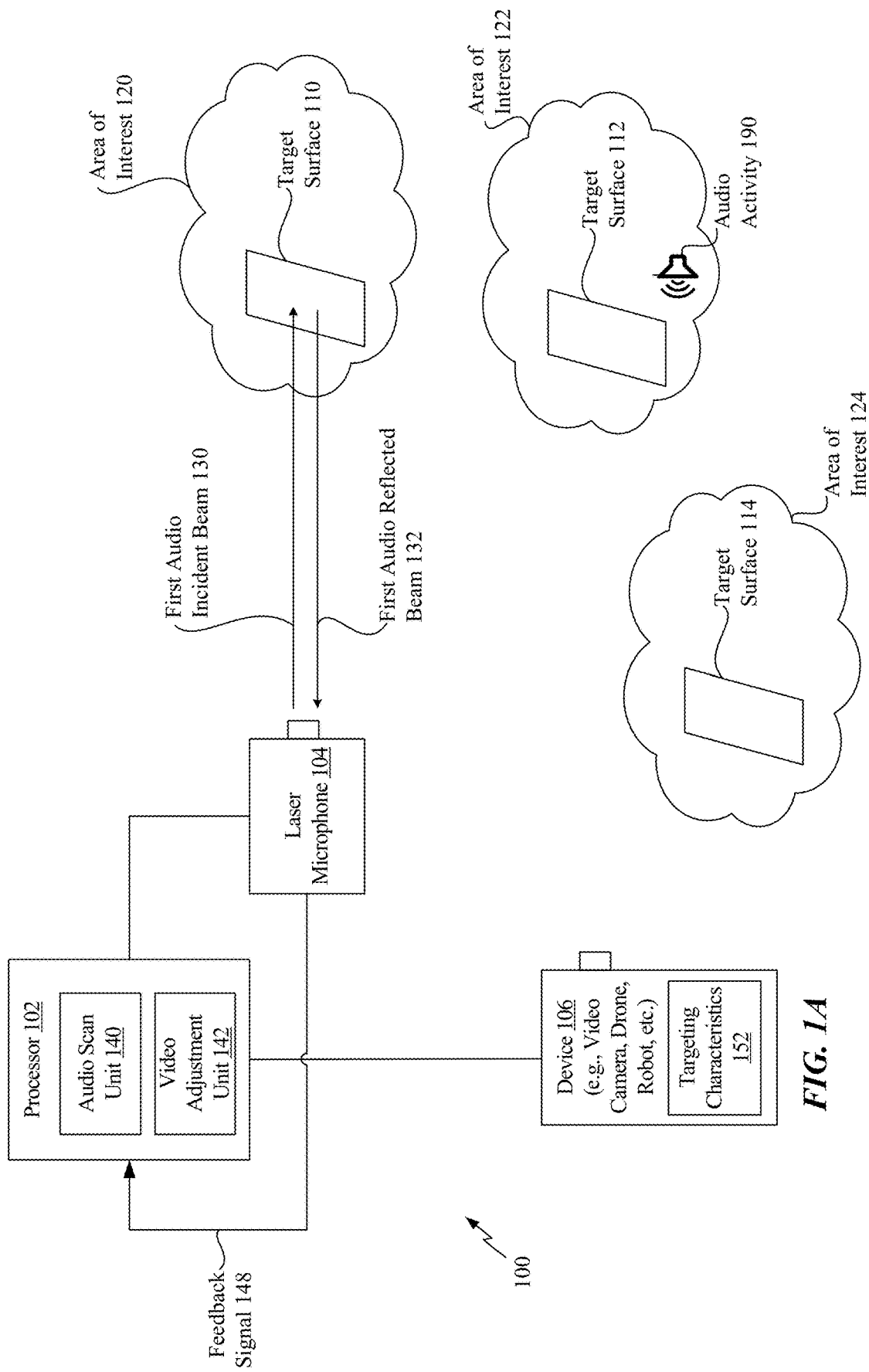
FIG. 1A is a diagram of a system that is operable to adjust targeting characteristics of a device based on feedback from a microphone.

Referring to FIG. 1A, a system 100 that is operable to adjust targeting characteristics of a device based on feedback from a microphone is shown. The system 100 includes a processor 102 that is coupled to a laser microphone 104 and to a device 106. The device 106 can include a video camera, a drone, a mobile robot, etc. As described herein, the device 106 can be adjusted to focus on different areas of interest. According to one implementation, the laser microphone 104 is a vibrometer. Although the laser microphone 104 is illustrated, in some scenarios, the techniques described below can be implemented using other types of microphones (e.g., a conventional microphone, a beamforming microphone array, etc.). However, as described below, the laser microphone 104 may be able to detect audio activity at greater distances than other types of microphones.

In FIG. 1A, different areas of interest 120, 122, 124 are depicted. A target surface 110 is associated with the area of interest 120, a target surface 112 is associated with the area of interest 122, and a target surface 114 is associated with the area of interest 124. The target surfaces 110, 112, 114 may include walls, chairs, tables, fixtures, windows, etc. As non-limiting examples, the area of interest 120 may include a bus stop and the target surface 110 may include a bench near the bus stop, the area of interest 122 may include a coffee shop and the target surface 112 may include a window of the coffee shop, and the area of interest 124 may include an office and the target surface 114 may include a wall of the office. It should be understood that the different areas of interest 120, 122, 124 (and the target surfaces 110, 112, 114) are not limited to the examples depicted above and may include any variety of different settings.

In FIG. 1A, audio activity 190 is present in the area of interest 122. According to one implementation, the audio activity 190 is speech. For example, the audio activity 190 may include one or more people talking. According to another implementation, the audio activity 190 is non-speech audio. As non-limiting examples, the audio activity 190 may include a dog barking, a car horn honking, footsteps, an approaching vehicle, or other audio sounds. Sound waves associated with the audio activity 190 collide with (e.g., reflect from) the target surface 112 and cause the target surface 112 to vibrate.

As described in greater detail below, the laser microphone 104 scans the areas of interest 120, 122, 124 by directing incident light beams at the target surfaces 110, 112, 114 to determine the effects that the vibrations of the target surfaces 110, 112, 114 have on properties of the incident light beams. The effects that the vibrations have on the incident light beams are represented in reflected light beams from the target surfaces 110, 112, 114. Because the vibrations of the target surfaces 110, 112, 114 are based on audio activity, such as the audio activity 190, the laser microphone 104 may detect audio activity based on characteristics of the reflected light beams. Upon detection of the audio activity, properties of the device 106 are adjusted to capture an environment that includes the audio activity.

The processor 102 includes an audio scan unit 140 and a video adjustment unit 142. The audio scan unit 140 is configured to instruct the laser microphone 104 to initiate an audio scan of different areas of interest 120, 122, 124 to detect audio activity. For example, the audio scan unit 140 may send one or more commands, instructions, or signals to the laser microphone 104 to adjust (e.g., rotate and tilt) the laser microphone 104 so that the laser microphone 104 performs an audio scan on the area of interest 120, the area of interest 122, and the area of interest 124. Although three areas of interest 120, 122, 124 are shown, in other implementations, the laser microphone 104 may perform audio scans at fewer or additional areas of interest, such as areas between the areas of interest 120, 122 and areas between the areas of interest 122, 124.

During the audio scan, the laser microphone 104 scans the area of interest 120 to determine whether audio activity is present in the area of interest 120. The process for scanning the area of interest 120 is described with respect to FIG. 2.

Figure 2:
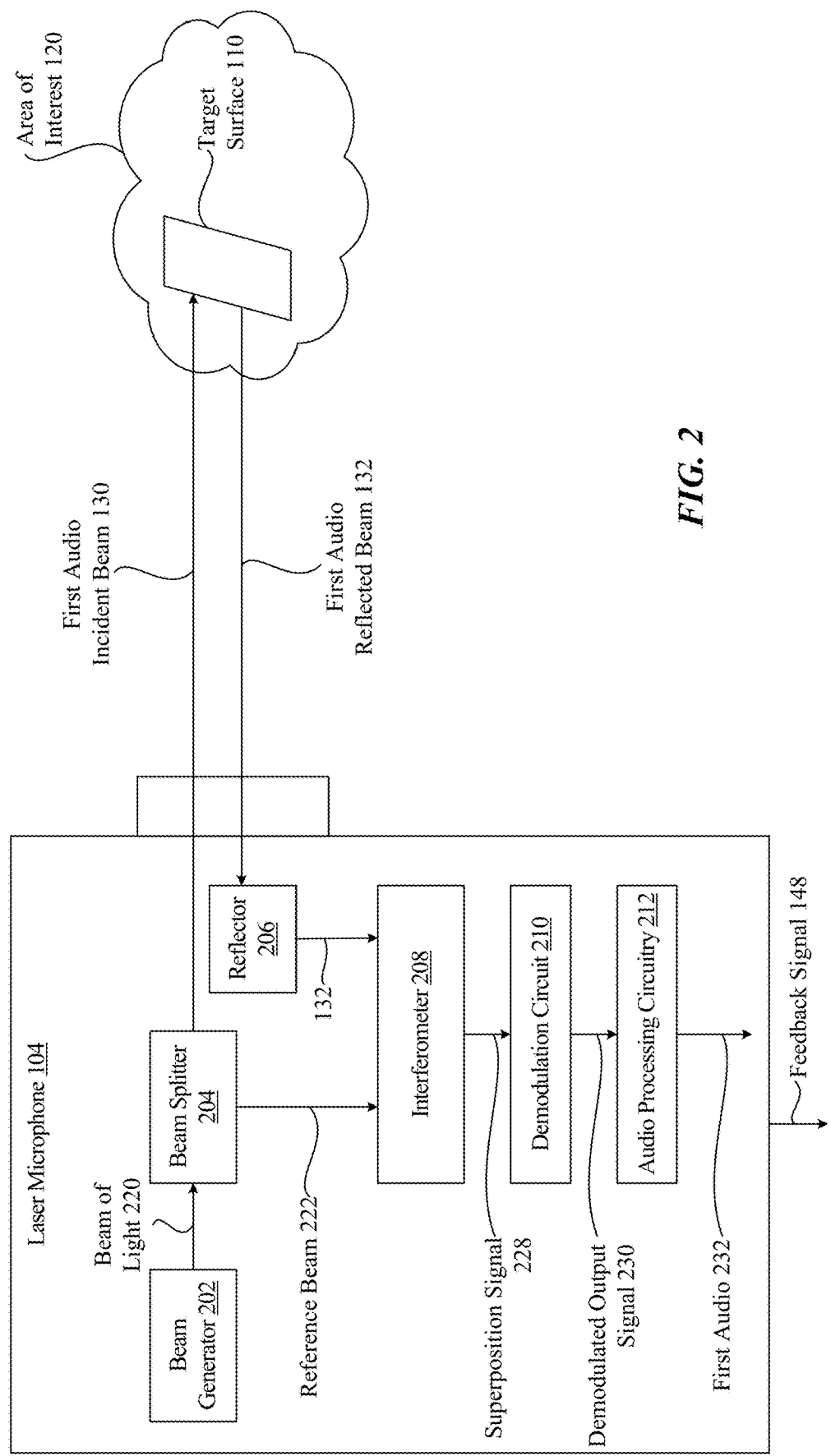
FIG. 2 is a diagram of a laser microphone scanning a first area of interest to detect audio activity.

FIG. 2 illustrates the laser microphone 104 scanning the area of interest 120. The laser microphone 104 includes a beam generator 202, a beam splitter 204, a reflector 206, an interferometer 208, a demodulation circuit 210, and audio processing circuitry 212.

The beam generator 202 is configured to generate a beam of light 220. The beam of light 220 has a particular frequency and a particular phase. The beam generator 202 directs the beam of light 220 towards the beam splitter 204. The beam splitter 204 is configured to split the beam of light 220 into a reference beam 222 and into a first audio incident beam 130. The reference beam 222 and the first audio incident beam 130 have similar properties. For example, the reference beam 222 and the first audio incident beam 130 have similar frequencies and phases. According to one implementation, the particular frequency of the beam of light 220 is similar to the frequencies of the beams 222, 130, and the particular phase of the beam of light 220 is similar to the phases of the beams 222, 130. The beam splitter 204 splits the beam of light 220 such that the reference beam 222 is provided to the interferometer 208 and the first audio incident beam 130 is directed towards the target surface 110.

The first audio incident beam 130 is reflected from the target surface 110 as a first audio reflected beam 132. The first audio reflected beam 132 may have similar properties as the first audio incident beam 130 based on the lack of vibrations of the target surface 110. For example, the frequency of the first audio reflected beam 132 and the phase of the first audio reflected beam 132 are based on the velocity and the displacement (e.g., the vibrations) of the target surface 110. Because there is no audio activity proximate to the area of interest 120, there are relatively small vibrations of the target surface 110.

The first audio reflected beam 132 is directed at the reflector 206, and the reflector 206 redirects the first audio reflected beam 132 to the interferometer 208. According to one implementation, the first audio reflected beam 132 is directed to the interferometer 208 without use of the reflector 206. The interferometer 208 is configured to perform a superposition operation on the first audio reflected beam 132 and the reference beam 222 to generate a superposition signal 228. The superposition signal 228 is provided to the demodulation circuit 210. The demodulation circuit 210 is configured to generate a demodulated output signal 230 based on the superposition signal 228. The demodulated output signal 230 indicates the shift (e.g., the "Doppler" shift) in frequency between the reference beam 222 and the first audio reflected beam 132. Because there is no audio activity proximate to the area of interest 120, and thus small or no vibrations of the target surface 110, the shift in frequency is relatively small. The demodulated output signal 230 is provided to the audio processing circuitry 212. The audio processing circuitry 212 is configured to perform audio processing operations to generate first audio 232.

Because there is no audio activity proximate to the area of interest 120, the first audio 232 may have a relatively low volume. Thus, the low volume of the first audio 232 may indicate that there is no audio activity in the area of interest 120. For example, an energy metric of the first audio 232 may be compared to an energy threshold to determine whether the first audio 232 represents audio activity. The laser microphone 104 may generate a feedback signal 148 indicating that there is no audio activity in the area of interest 120.

Figure 1B:
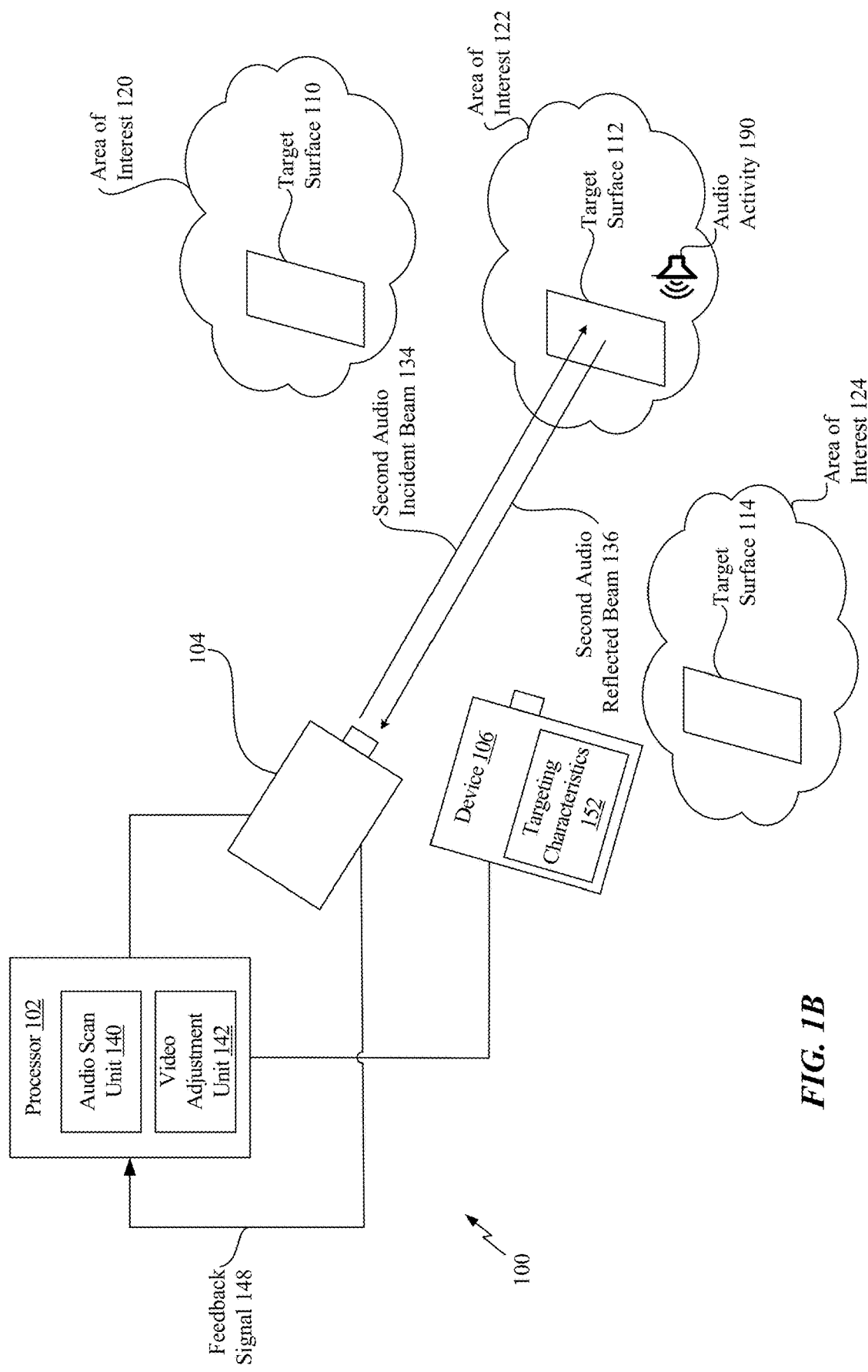
FIG. 1B is another diagram of the system of FIG. 1A.

Referring back to FIG. 1A, the processor 102 receives the feedback signal 148 indicating that there is no audio activity in the area of interest 120. Based on the feedback signal 148, the video adjustment unit 142 bypasses adjustment of targeting characteristics 152 of the device 106 and the audio scan unit 140 scans the next area of interest 122, as shown in FIG. 1B. For example, because there is no audio activity in the area of interest 120, the video adjustment unit 142 determines there is no need to focus the device 106 on the area of interest 120. The process for scanning the area of interest 122 is described with respect to FIG. 3.

Figure 3:
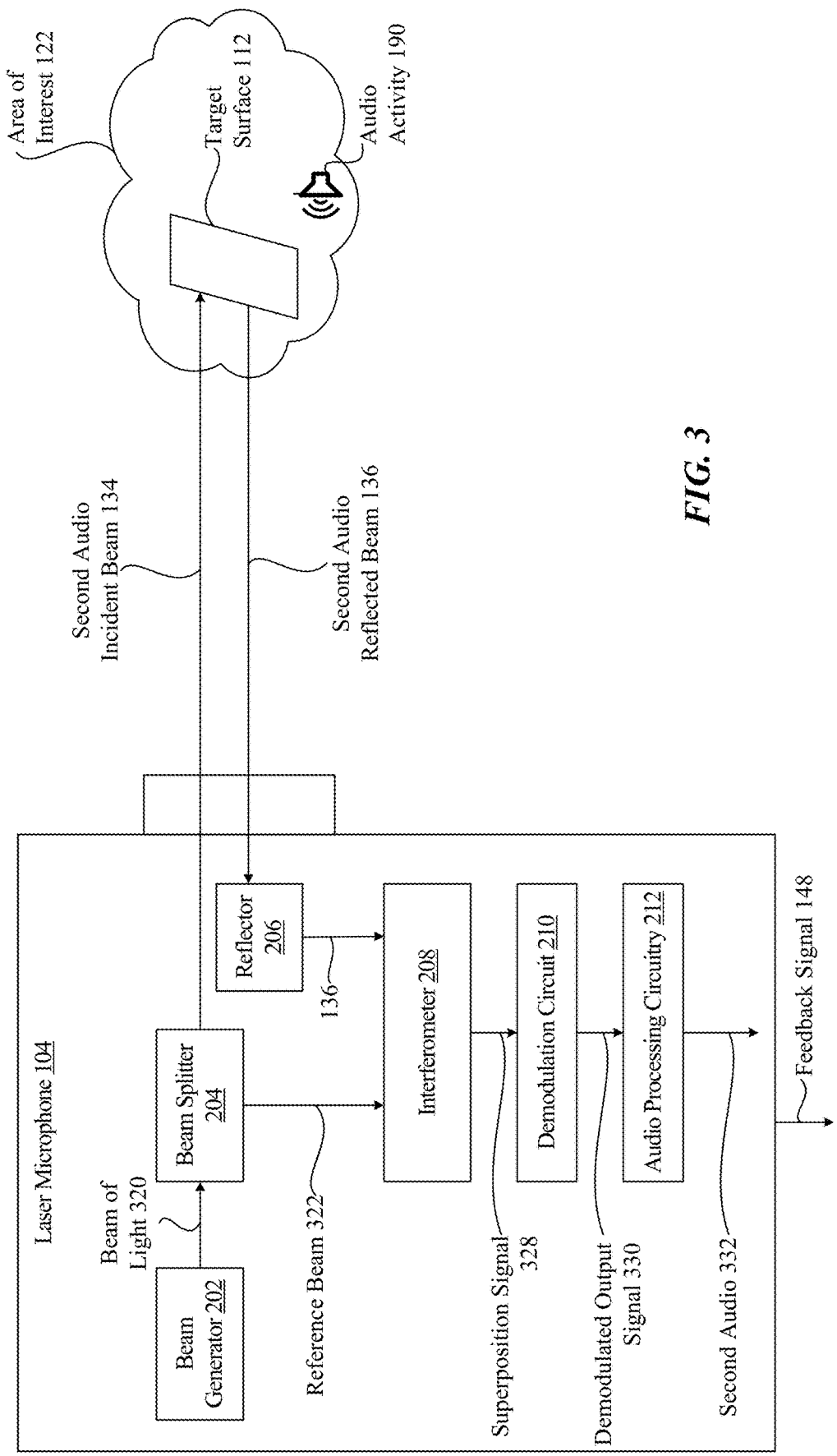
FIG. 3 is a diagram of the laser microphone scanning a second area of interest to detect audio activity.

FIG. 3 illustrates the laser microphone 104 scanning the area of interest 122. The beam generator 202 is configured to generate a beam of light 320. The beam of light 320 has a particular frequency and a particular phase. The beam generator 202 directs the beam of light 320 towards the beam splitter 204. The beam splitter 204 is configured to split the beam of light 320 into a reference beam 322 and into a second audio incident beam 134. The reference beam 322 and the second audio incident beam 134 have similar properties. For example, the reference beam 322 and the second audio incident beam 134 have similar frequencies and phases. According to one implementation, the particular frequency of the beam of light 320 is similar to the frequencies of the beams 322, 134, and the particular phase of the beam of light 320 is similar to the phases of the beams 322, 134. The beam splitter 204 splits the beam of light 320 such that the reference beam 322 is provided to the interferometer 208 and the second audio incident beam 134 is directed towards the target surface 112.

The second audio incident beam 134 is reflected from the target surface 112 as a second audio reflected beam 136. The second audio reflected beam 136 may have different properties (e.g., a different frequency, a different phase, or both) than the second audio incident beam 130 based on the vibrations of the target surface 110. For example, variations of the frequency of the second audio reflected beam 136 and the phase of the second audio reflected beam 136 are based on the velocity and the displacement (e.g., the vibrations) of the target surface 112. The vibrations of the target surface 112 are based on sound waves (associated with the audio activity 190 proximate to the area of interest 122) colliding with the target surface 112. Thus, the frequency of the second audio reflected beam 136 and the phase of the second audio reflected beam 136 is representative, at least in part, of the audio activity 190 proximate to the area of interest 122.

The second audio reflected beam 136 is directed at the reflector 206, and the reflector 206 redirects the second audio reflected beam 136 to the interferometer 208. According to one implementation, the second audio reflected beam 136 is directed to the interferometer 208 without use of the reflector 206. The interferometer 208 is configured to perform a superposition operation on the second audio reflected beam 136 and the reference beam 322 to generate a superposition signal 328. The superposition signal 328 is provided to the demodulation circuit 210. The demodulation circuit 210 is configured to generate a demodulated output signal 330 based on the superposition signal 328. The demodulated output signal 330 indicates the shift (e.g., the "Doppler" shift) in frequency between the reference beam 322 and the second audio reflected beam 136. The shift in frequency is based on the sound waves (associated with the audio activity 190 proximate to the area of interest 122) colliding with the target surface 112. The demodulated output signal 330 is provided to the audio processing circuitry 212. The audio processing circuitry 212 is configured to perform audio processing operations to generate second audio 332.

According to some implementations, the laser microphone 104 can detect the audio activity 190 if the audio activity 190 is behind a barrier within the area of interest 122. For example, if the target surface 112 corresponds to a wall that is between the laser microphone 104 and a sound source of the audio activity 190, the laser microphone 104 can detect the audio activity 190 by directing the second audio incident beam 134 at the wall to generate the second audio 332.

Because there is audio activity 190 proximate to the area of interest 122, the second audio 332 may have a relatively high volume. Thus, the high volume of the second audio 332 may indicate that there is audio activity 190 in the area of interest 122. For example, an energy metric of the second audio 332 may be compared to the energy threshold to determine whether the second audio 332 represents audio activity. The laser microphone 104 may generate a feedback signal 148 indicating that there is audio activity 190 in the area of interest 122.

According to one implementation, the first audio 232 and the second audio 332 are generated concurrently. For example, the laser microphone 104 concurrently emits the two audio incident beams 130, 134 to scan different areas of interest 120, 122 for audio activity. According to another implementation, the laser microphone 104 generates the first audio 232, and generates the second audio 332 after generation of the first audio 232. For example, the laser microphone 104 sequentially scans different areas of interest 120, 122 for audio activity.

Referring back to FIG. 1B, the processor 102 receives the feedback signal 148 indicating that there is audio activity 190 in the area of interest 122. Based on the feedback signal 148, the video adjustment unit 142 adjusts the targeting characteristics 152 of the device 106 to focus the device 106 on (e.g., orient in the direction of) the area of interest 122. According to one implementation, the targeting characteristics 152 includes at least one of an angle of rotation of the device 106, a tilt of the device 106, a zoom level of the device 106, a wavelength filter of the device 106, a position of the device 106, or a focus metric of the device 106. According to one implementation, the wavelength filter can be an infrared (IR) wavelength filter or a visual light wavelength filter. Thus, the laser microphone 104 scans the different areas of interest 120, 122, 124 and provides the feedback signal 148 to the processor 102 indicating areas where audio activity 190 is present. Based on the feedback signal 148, the processor 102 adjusts the targeting characteristics 152 of the device 106 to focus the device 106 on the areas where there is audio activity 190 (e.g., the area of interest 122).

The techniques described with respect to FIGS. 1A-3 enable the device 106 to capture video of areas where there is audio activity as opposed to capturing video of areas where there is relatively little to no audio activity. For example, the laser microphone 104 scans the areas of interest 120, 122, 124 for audio activity. According to some implementations, the laser microphone 104 scans areas around obstructions and dark spots that are within a field of view of the device 106. The laser microphone 104 (or the processor 102) analyzes the audio 232, 332 captured by the laser microphone 104 to determine the presence of activity in the areas of interest 120, 122, respectively. Based on the analysis, the processor 102 adjusts the targeting characteristics 152 of the device 106 to focus on the area of interest 122 with the audio activity 190. For example, the device 106 may adjust (e.g., tilt, rotate, zoom, or a combination thereof) to capture video of the area of interest 122. As a result, a single device 106 can capture video of activity using audio triggers captured by the laser microphone 104.

Figure 4:
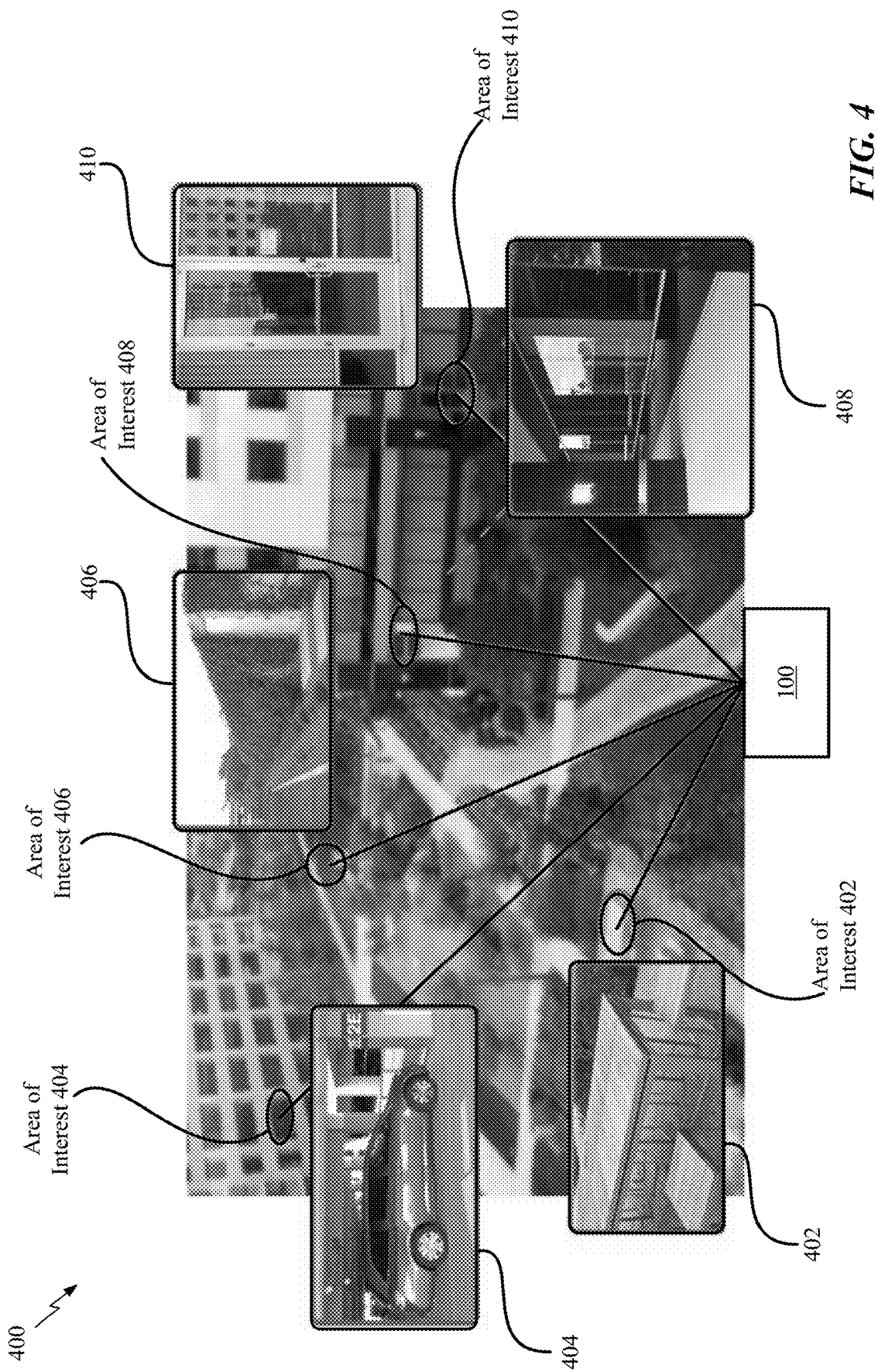
FIG. 4 is a diagram of a scene having different areas of interest.

Referring to FIG. 4, a diagram of a scene 400 having different areas of interest is shown. The system 100 of FIGS. 1A-1B may perform an audio scan of the scene 400 and adjust the targeting characteristics 152 of the device 106 to focus on different areas of interest of the scene 400, such as described with respect to FIGS. 1A-3.

The scene 400 includes an area of interest 402, an area of interest 404, an area of interest 406, an area of interest 408, and an area of interest 410. According to FIG. 4, the area of interest 402 includes a park bench, the area of interest 404 includes a parking garage, the area of interest 406 includes an outside wall, the area of interest 408 includes a sidewalk of an office building, and the area of interest 410 includes a door of an office building. It should be understood that the areas of interest 402-410 are merely non-limiting illustrative examples and should not be construed as limiting. According to some implementations, one or more of the areas of interest 120, 122, 124 of FIGS. 1A-1B corresponds to one or more of the areas of interest 402-410 of FIG. 4.

The laser microphone 104 may scan each area of interest 402-410 to detect audio activity, as described with respect to FIGS. 1A-3. For example, the laser microphone 104 may scan the area of interest 402 by directing an incident beam at a target surface (e.g., the park bench), as described with respect to FIGS. 2-3. If the laser microphone 104 determines that audio activity is present in the area of interest 402, the processor 102 may adjust the targeting characteristics 152 of the device 106 to focus the device 106 on the area of interest 402. If the laser microphone 104 determines that audio activity is not present in the area of interest 402, the laser microphone 104 continues to scan the scene 400.

After scanning the area of interest 402, the laser microphone 104 may scan the area of interest 404 by directing an incident beam at a target surface (e.g., a car window), as described with respect to FIGS. 2-3. If the laser microphone 104 determines that audio activity is present in the area of interest 404, the processor 102 may adjust the targeting characteristics 152 of the device 106 to focus the device 106 on the area of interest 404. If the laser microphone 104 determines that audio activity is not present in the area of interest 404, the laser microphone 104 continues to scan the scene 400.

After scanning the area of interest 404, the laser microphone 104 may scan the area of interest 406 by directing an incident beam at a target surface (e.g., the outside wall), as described with respect to FIGS. 2-3. If the laser microphone 104 determines that audio activity is present in the area of interest 406, the processor 102 may adjust the targeting characteristics 152 of the device 106 to focus the device 106 on the area of interest 406. If the laser microphone 104 determines that audio activity is not present in the area of interest 406, the laser microphone 104 continues to scan the scene 400.

After scanning the area of interest 406, the laser microphone 104 may scan the area of interest 408 by directing an incident beam at a target surface (e.g., a window), as described with respect to FIGS. 2-3. If the laser microphone 104 determines that audio activity is present in the area of interest 408, the processor 102 may adjust the targeting characteristics 152 of the device 106 to focus the device 106 on the area of interest 408. If the laser microphone 104 determines that audio activity is not present in the area of interest 408, the laser microphone 104 continues to scan the scene 400.

After scanning the area of interest 408, the laser microphone 104 may scan the area of interest 410 by directing an incident beam at a target surface (e.g., an office door), as described with respect to FIGS. 2-3. If the laser microphone 104 determines that audio activity is present in the area of interest 410, the processor 102 may adjust the targeting characteristics 152 of the device 106 to focus the device 106 on the area of interest 410. If the laser microphone 104 determines that audio activity is not present in the area of interest 410, the laser microphone 104 continues to scan the scene 400.

The techniques described with respect to FIG. 4 enable the device 106 to capture video of the scene 400 where there is audio activity as opposed to capturing video of the scene 400 where there is relatively little to no audio activity. For example, the laser microphone 104 scans the areas of interest 402-410 for audio activity. The laser microphone 104 coupled to the device 106 can provide a relatively precise location and direction of audio activity compared to an approximate direction provided by a beamforming acoustic microphone array. Additionally, the laser microphone 104 can capture audio activity at a relatively far distance compared to a conventional microphone coupled to a security camera. According to some implementations, the laser microphone 104 scans areas around obstructions and dark spots that are within a field of view of the device 106. For example, the laser microphone 104 scans the parking garage (e.g., the area of interest 404). Based on the scan, the processor 102 adjusts the targeting characteristics 152 of the device 106 to focus on the areas of interest within the scene 400 with the audio activity. For example, the device 106 may adjust (e.g., tilt, rotate, zoom, or a combination thereof) to capture video where there is audio activity. As a result, a single device may be used to capture activity within a large area.

Figure 5A:
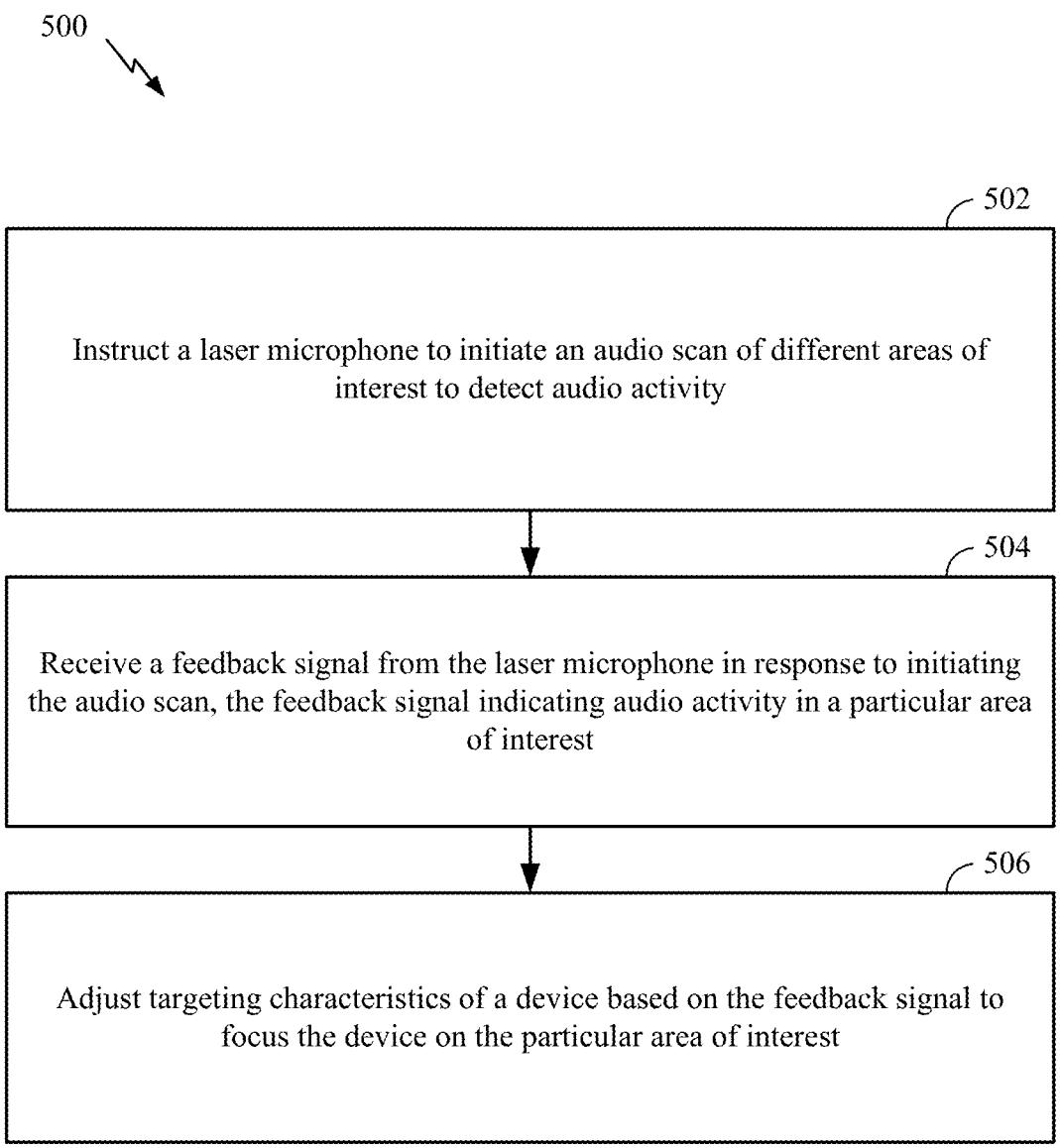
FIG. 5A illustrates a flowchart of a method of adjusting targeting characteristics of a device based on feedback from a microphone.

Referring to FIG. 5A, a method 500 for adjusting targeting characteristics of a device based on feedback from a laser microphone is shown. The method 500 may be performed by the system 100.

The method 500 includes instructing a laser microphone to initiate an audio scan of different areas of interest to detect audio activity, at 502. For example, referring to FIG. 1A, the audio scan unit 140 instructs the laser microphone 104 to initiate the audio scan of different areas of interest 120, 122, 124 to detect audio activity. To illustrate, the audio scan unit 140 adjusts (e.g., rotates and tilts) the laser microphone 104 so that the laser microphone 104 performs an audio scan on the area of interest 120, the area of interest 122, and the area of interest 124.

The method 500 also includes receiving a feedback signal from the laser microphone in response to initiating the audio scan, at 504. The feedback signal indicates audio activity in a particular area of interest. For example, referring to FIG. 1B, the laser microphone 104 generates the feedback signal 148 indicating that there is audio activity 190 in the area of interest 122.

The method 500 also includes adjusting targeting characteristics of a device based on the feedback signal to focus the device on the particular area of interest, at 506. For example, referring to FIG. 1B, the video adjustment unit 142 adjusts the targeting characteristics 152 of the device 106 based on the feedback signal 148 to focus the device 106 on the area of interest 122. According to one implementation, the targeting characteristics 152 includes at least one of an angle of rotation of the device 106, a tilt of the device 106, a zoom level of the device 106, a wavelength filter of the device 106, a position of the device 106, or a focus metric of the device 106. According to one implementation, the particular area of interest (e.g., the area of interest 122) is outside a field of view of the device 106 prior to adjustment of the targeting characteristics 152. According to another implementation, the particular area of interest is within a field of view of the device 106 prior to adjustment of the targeting characteristics 152.

Thus, the laser microphone 104 scans the different areas of interest 120, 122, 124 and provides the feedback signal 148 to the processor 102 indicating areas where audio activity 190 is present. Based on the feedback signal 148, the processor 102 adjusts the targeting characteristics 152 of the device 106 to focus the device on the areas where there is audio activity 190 (e.g., the area of interest 122).

The method 500 of FIG. 5A enables the device 106 to capture video of areas where there is audio activity as opposed to capturing video of areas where there is relatively little to no audio activity. For example, the laser microphone 104 scans the areas of interest 120, 122, 124 for audio activity. According to some implementations, the laser microphone 104 can detect audio activity even though obstructions and dark spots limit a field of view of the device 106. If audio activity is detected near the obstructions or near the dark spots, the device 106 adjusts to capture video (e.g., higher quality video) of the obstructions or dark spots. The laser microphone 104 (or the processor 102) analyzes the audio 232, 332 captured by the laser microphone 104 to determine the presence of activity in the areas of interest 120, 122, respectively. Based on the analysis, the processor 102 adjusts the targeting characteristics 152 of the device 106 to focus on the area of interest 122 with the audio activity 190. For example, the device 106 may adjust (e.g., tilt, rotate, zoom, or a combination thereof) to capture video of the area of interest 122. As a result, a single device 106 can capture video of activity using audio triggers captured by the laser microphone 104.

Figure 5B:
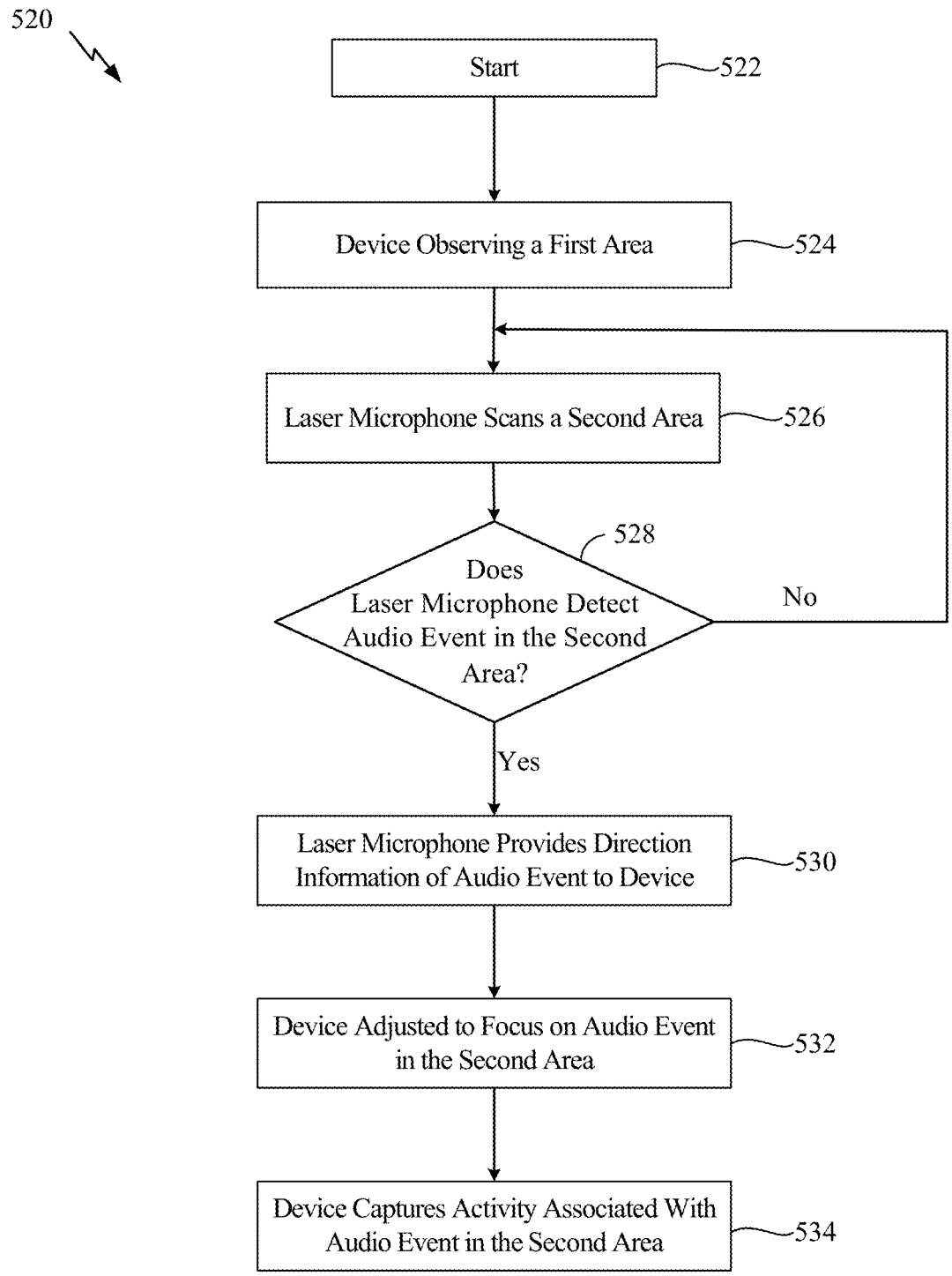
FIG. 5B illustrates a flowchart of a method of scanning different areas of interest for audio activity.

Referring to FIG. 5B, a method 520 for scanning different areas of interest for audio activity is shown. The method 520 may be performed by the system 100.

At 522, the method 520 starts. The method 520 includes observing a first area with a device, at 524. For example, device 106 may observe the area of interest 120. To illustrate, the device 106 may capture video of the area of interest 120. At 526, a laser microphone scans a second area. For example, the laser microphone 104 scans the area of interest 122 for audio activity. The method 520 includes determining whether the laser microphone detects an audio event in the second area, at 528. If the laser microphone does not detect an audio event in the second area, the method 520 returns to 526. For example, the laser microphone 104 scans another area of interest (e.g., the area of interest 124).

However, if the laser microphone detects an audio event in the second area, the laser microphone provides direction information of the audio event to the device, at 530. For example, the laser microphone 104 provides the feedback signal 148 to the processor 102. The feedback signal 148 may include directional information (e.g., location information) of the audio activity 190. At 532, the device is adjusted to focus on the audio event in the second area. For example, the targeting characteristics 152 are adjusted to focus the device 106 on the area of interest 122. At 534, the device captures activity associated with the audio event in the second area. For example, the device 106 captures video of the area of interest 122. According to some implementations, if the device 106 is unable to capture video of the area of interest 122 (e.g., because the area of interest 122 is too dark, too far away, etc.), the activity in the area of interest 122 is monitored using the laser microphone 104 (e.g., audio monitoring).

The method 520 of FIG. 5B enables the device 106 to capture video of areas where there is audio activity as opposed to capturing video of areas where there is relatively little to no audio activity. For example, the laser microphone 104 scans the areas of interest 120, 122, 124 for audio activity.

Figure 6:
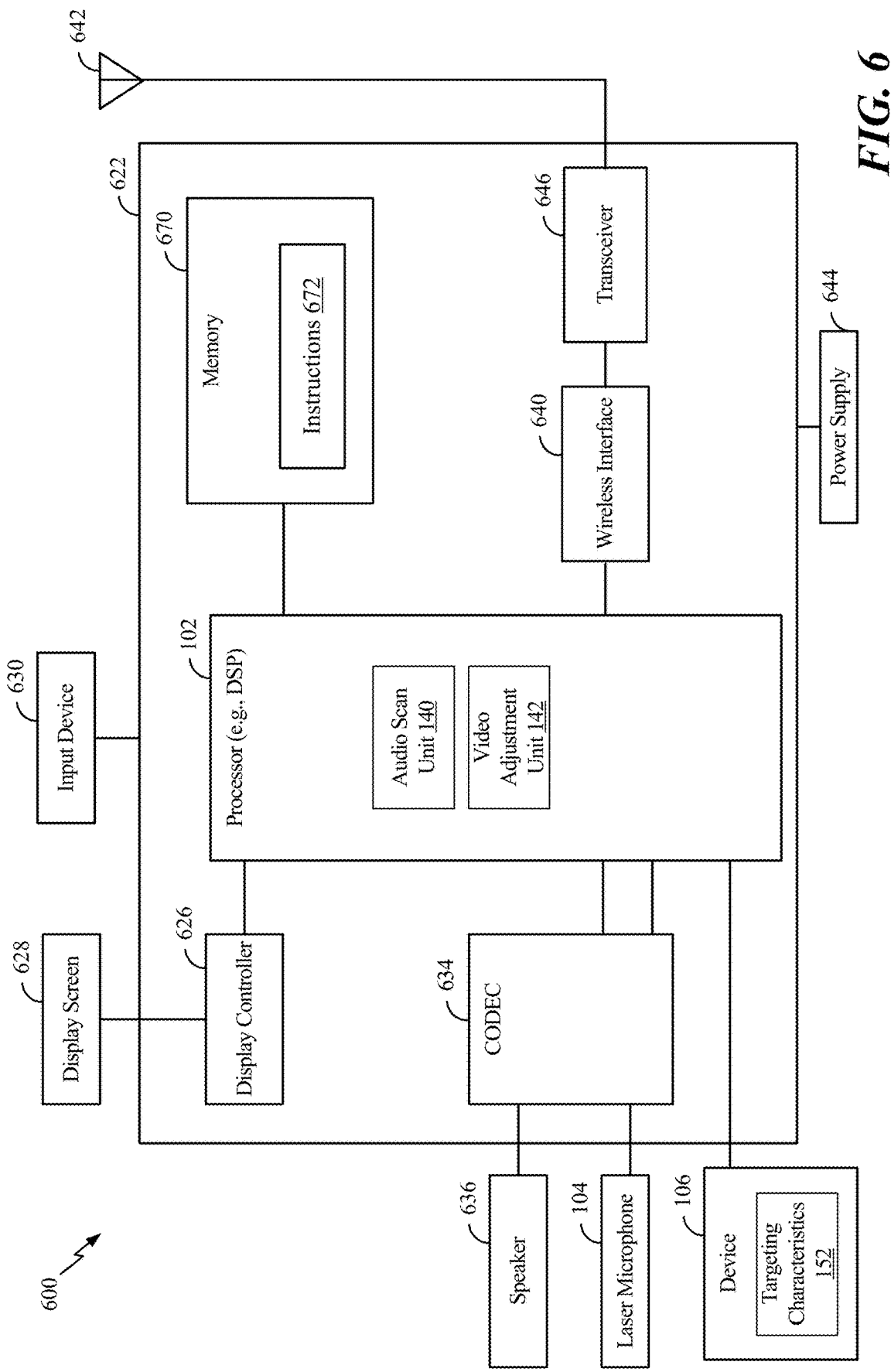
FIG. 6 is a block diagram of a particular illustrative example of a mobile device that is operable to perform the techniques described with reference to FIGS. 1A-5.

Referring to FIG. 6, a block diagram of a particular illustrative implementation of a mobile device 600 (e.g., a wireless communication device) is shown. In various implementations, the mobile device 600 may have more components or fewer components than illustrated in FIG. 6. In a particular implementation, the mobile device 600 includes the processor 102, such as a central processing unit (CPU) or a digital signal processor (DSP), coupled to a memory 670. The memory 670 includes instructions 672 (e.g., executable instructions) such as computer-readable instructions or processor-readable instructions. The instructions 672 may include one or more instructions that are executable by a computer, such as the processor 102.

FIG. 6 also illustrates a display controller 626 that is coupled to the processor 102 and to a display screen 628. A coder/decoder (CODEC) 634 may also be coupled to the processor 102. A speaker 636 and the laser microphone 104 are coupled to the CODEC 634. The device 106 is also coupled to the processor 102. FIG. 6 further illustrates that a wireless interface 640, such as a wireless controller, and a transceiver 646 may be coupled to the processor 102 and to an antenna 642, such that wireless data received via the antenna 642, the transceiver 646, and the wireless interface 640 may be provided to the processor 102.

In some implementations, the processor 102, the display controller 626, the memory 670, the CODEC 634, the wireless interface 640, and the transceiver 646 are included in a system-in-package or system-on-chip device 622. In some implementations, an input device 630 and a power supply 644 are coupled to the system-on-chip device 622. Moreover, in a particular implementation, as illustrated in FIG. 6, the display screen 628, the input device 630, the speaker 636, the laser microphone 104, the device 106, the antenna 642, and the power supply 644 are external to the system-on-chip device 622. In a particular implementation, each of the display screen 628, the input device 630, the speaker 636, the laser microphone 104, the device 106, the antenna 642, and the power supply 644 may be coupled to a component of the system-on-chip device 622, such as an interface or a controller.

The mobile device 600 may include a headset, a smart watch, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 670 may include or correspond to a non-transitory computer readable medium storing the instructions 672. The instructions 672 may include one or more instructions that are executable by a computer, such as the processor 102. The instructions 672 may cause the processor 102 to perform the method 500 of FIG. 5A, the method 520 of FIG. 5B, or both.

One or more components of the mobile device 600 may be implemented via dedicated hardware (e.g., circuitry), by a processor executing instructions to perform one or more tasks, or a combination thereof. As an example, the memory 670 or one or more components of the processor 102, and/or the CODEC 634 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 672) that, when executed by a computer (e.g., a processor in the CODEC 634 or the processor 102), may cause the computer to perform one or more operations described with reference to FIGS. 1A-5.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, an apparatus includes means for scanning different areas of interest to detect audio activity. For example, the means for scanning may include the laser microphone 104, one or more other devices, circuits, modules, sensors, or any combination thereof.

The apparatus also includes means for capturing video. For example, the means for capturing video may include the device 106, one or more other devices, circuits, modules, sensors, or any combination thereof.

The apparatus also includes means for adjusting targeting characteristics of the means for capturing video based on a feedback signal to focus the means for capturing video on a particular area of interest. For example, the means for adjusting may include the processor 102, one or more other devices, circuits, modules, or any combination thereof. The feedback signal is received from the means for scanning, and the feedback signal indicates audio activity in the particular area of interest.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
a microphone;
a capture device; and
a processor coupled to the microphone and to the capture device, the processor configured to:
   instruct the microphone to initiate an audio scan of different areas of interest to detect audio activity, the different areas of interest comprising:
      a first area of interest; and
      a second area of interest; and
   receive a first feedback signal from the microphone in response to initiating the audio scan of the first area of interest, the first feedback signal generated based on a first comparison of an energy metric detected from the audio scan of the first area of interest and an energy threshold, and the first feedback signal indicating audio activity below an audio threshold in the first area of interest;
   initiate a second audio scan of the second area responsive to the first feedback signal;
   receive a second feedback signal from the microphone in response to initiating the second audio scan of the first area of interest, the second feedback signal generated based on a comparison of an energy metric detected from the second audio scan of the second area of interest and the energy threshold, and the second feedback signal indicating audio activity in the second area of interest; and
   adjust targeting characteristics of the capture device based on the second feedback signal to focus the capture device on the second area of interest.

2. The apparatus of claim 1, wherein the targeting characteristics include at least one of an angle of rotation of the capture device, a tilt of the capture device, a zoom level of the capture device, a position of the capture device, or a focus metric of the capture device.

3. The apparatus of claim 1, wherein the microphone is a laser microphone configured to:
   generate a first beam of light at the laser microphone;
   split the first beam of light into a first reference beam and into a first incident beam that is directed towards a first target surface associated with the first area of interest, the first reference beam and the first incident beam having similar properties;
   receive a first reflected beam from the first target surface, the first reflected beam corresponding a reflected version of the first incident beam, and the first reflected beam and the first incident beam having different properties;
   perform a superposition operation on the first reflected beam and the first reference beam to generate a first demodulated output signal;
   generate first audio based on the first demodulated output signal; and
   determine whether audio activity is present in the first area of interest based on the first audio.

4. The apparatus of claim 3, wherein the laser microphone is configured to:
   generate a second beam of light at the laser microphone;
   split the second beam of light into a second reference beam and into a second incident beam that is directed towards a second target surface associated with the second area of interest, the second reference beam and the second incident beam having similar properties;
   receive a second reflected beam from the second target surface, the second reflected beam corresponding a reflected version of the second incident beam, and the second reflected beam and the second incident beam having different properties;
   perform a superposition operation on the second reflected beam and the second reference beam to generate a second demodulated output signal;
   generate second audio based on the second demodulated output signal; and
   determine whether audio activity is present in the second area of interest based on the second audio.

5. The apparatus of claim 1, wherein the microphone includes a vibrometer.

6. The apparatus of claim 1, wherein the capture device includes a video camera, a drone, or a mobile robot.

7. The apparatus of claim 1, wherein the processor is further configured to identify the different areas of interest based on image data captured by the capture device.

8. A method of capturing video with a capture device, the method comprising:
   instructing a microphone to initiate an audio scan of different areas of interest to detect audio activity, the different areas of interest comprising:
      a first area of interest; and
      a second area of interest;
   receiving a first feedback signal from the microphone in response to initiating the audio scan of the first area of interest, the first feedback signal generated based on a first comparison of an energy metric detected from the audio scan of the first area of interest and an energy threshold, and the first feedback signal indicating audio activity below an audio threshold in the first area of interest;
   initiating a second audio scan of the second area responsive to the first feedback signal;
   receiving a second feedback signal from the microphone in response to initiating the second audio scan of the first area of interest, the second feedback signal generated based on a comparison of an energy metric detected from the second audio scan of the second area of interest and the energy threshold, and the second feedback signal indicating audio activity in the second area of interest; and
   adjusting targeting characteristics of the capture device based on the second feedback signal to focus the capture device on the second area of interest.

9. The method of claim 8, wherein the targeting characteristics include at least one of an angle of rotation of the capture device, a tilt of the capture device, a zoom level of the capture device, a position of the capture device, or a focus metric of the capture device.

10. The method of claim 8, wherein the microphone is a laser microphone, and wherein performing the audio scan comprises performing an audio scan of the first area of interest by:
   generating a first beam of light at the laser microphone;
   splitting the first beam of light into a first reference beam and into a first incident beam that is directed towards a first target surface associated with the first area of interest, the first reference beam and the first incident beam having similar properties;
   receiving a first reflected beam from the first target surface, the first reflected beam corresponding a reflected version of the first incident beam, and the first reflected beam and the first incident beam having different properties;

performing a superposition operation on the first reflected beam and the first reference beam to generate a first demodulated output signal;

generating first audio based on the first demodulated output signal; and determining whether audio activity is present in the first area of interest based on the first audio.

11. The method of claim 10, wherein performing the second audio scan further comprises performing an audio scan of the second area of interest by:

generating a second beam of light at the laser microphone;

splitting the second beam of light into a second reference beam and into a second incident beam that is directed towards a second target surface associated with the second area of interest, the second reference beam and the second incident beam having similar properties;

receiving a second reflected beam from the second target surface, the second reflected beam corresponding a reflected version of the second incident beam, and the second reflected beam and the second incident beam having different properties;

performing a superposition operation on the second reflected beam and the second reference beam to generate a second demodulated output signal;

generating second audio based on the second demodulated output signal; and determining whether audio activity is present in the second area of interest based on the second audio.

12. The method of claim 8, wherein the microphone includes a vibrometer.

13. The method of claim 8, wherein the capture device includes a video camera, a drone, or a mobile robot.

14. The method of claim 8, wherein the audio activity comprises speech or non-speech audio.

15. A non-transitory computer-readable medium comprising instructions that, when executed by a processor, cause the processor to perform operations comprising:

instructing a microphone to initiate an audio scan of different areas of interest to detect audio activity, the different areas of interest comprising:
a first area of interest; and
a second area of interest; and receiving a first feedback signal from the microphone in response to initiating the audio scan of the first area of interest, the first feedback signal generated based on a first comparison of an energy metric detected from the audio scan of the first area of interest and an energy threshold, and the first feedback signal indicating audio activity below an audio threshold in the first area of interest;

initiating a second audio scan of the second area responsive to the first feedback signal;

receiving a second feedback signal from the microphone in response to initiating the second audio scan of the first area of interest, the second feedback signal generated based on a comparison of an energy metric detected from the second audio scan of the second area of interest and the energy threshold, and the second feedback signal indicating audio activity in the second area of interest; and adjusting targeting characteristics of the capture device based on the second feedback signal to focus the capture device on the second area of interest.

16. The non-transitory computer-readable medium of claim 15, wherein the targeting characteristics include at least one of an angle of rotation of the capture device, a tilt of the capture device, a zoom level of the capture device, a position of the capture device, or a focus metric of the capture device.

17. The non-transitory computer-readable medium of claim 15, wherein the microphone is a laser microphone, and wherein performing the audio scan comprises performing an audio scan of the first area of interest by:

generating a first beam of light at the laser microphone;

splitting the first beam of light into a first reference beam and into a first incident beam that is directed towards a first target surface associated with the first area of interest, the first reference beam and the first incident beam having similar properties;

receiving a first reflected beam from the first target surface, the first reflected beam corresponding a reflected version of the first incident beam, and the first reflected beam and the first incident beam having different properties;

performing a superposition operation on the first reflected beam and the first reference beam to generate a first demodulated output signal;

generating first audio based on the first demodulated output signal; and determining whether audio activity is present in the first area of interest based on the first audio.

18. The non-transitory computer-readable medium of claim 17, wherein performing the second audio scan further comprises performing an audio scan of the second area of interest by:

generating a second beam of light at the laser microphone;

splitting the second beam of light into a second reference beam and into a second incident beam that is directed towards a second target surface associated with the second area of interest, the second reference beam and the second incident beam having similar properties;

receiving a second reflected beam from the second target surface, the second reflected beam corresponding a reflected version of the second incident beam, and the second reflected beam and the second incident beam having different properties;

performing a superposition operation on the second reflected beam and the second reference beam to generate a second demodulated output signal;

generating second audio based on the second demodulated output signal; and determining whether audio activity is present in the second area of interest based on the second audio.

19. The non-transitory computer-readable medium of claim 15, wherein the microphone includes a vibrometer.

20. The non-transitory computer-readable medium of claim 15, wherein the capture device includes a video camera, a drone, or a mobile robot.

21. The non-transitory computer-readable medium of claim 15, wherein the audio activity comprises speech or non-speech audio.

22. An apparatus comprising:

means for scanning different areas of interest to detect audio activity, the different areas of interest comprising:
a first area of interest; and
a second area of interest;

means for capturing video;

means for initiating a second audio scan of the second area responsive to a first feedback signal received in response to scanning the first area of interest during a first audio scan using the means for scanning, the first feedback signal generated based on a first comparison of an energy metric detected from the first audio scan of the first area of interest and an energy threshold, and the first feedback signal indicating audio activity below an audio threshold in the first area of interest; and means for adjusting targeting characteristics of the means for capturing video based on a second feedback signal to focus the means for capturing video on a second area of interest, the second feedback signal received in response to scanning the second area of interest using the means for scanning, the second feedback signal generated based on a comparison of the energy metric detected from the first audio scan of the first area of interest and the energy threshold, and the second feedback signal indicating audio activity in the second area of interest.

23. The apparatus of claim 22, wherein the targeting characteristics include at least one of an angle of rotation of the means for capturing video, a tilt of the means for capturing video, a zoom level of the means for capturing video, a position of the means for capturing video, or a focus metric of the means for capturing video.

\* \* \* \* \*